(12) United States Patent
Shelton et al.

(10) Patent No.: US 10,174,768 B2
(45) Date of Patent: Jan. 8, 2019

(54) CENTRIFUGAL BLOWER AND METHOD OF ASSEMBLING THE SAME

(71) Applicant: Regal Beloit America, Inc., Beloit, WI (US)

(72) Inventors: Kerry B. Shelton, Fort Wayne, IN (US); Rafal Pawel Rohoza, Fort Wayne, IN (US); Joseph Carnes, Columbia City, IN (US); Carter Delaney, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 328 days.

(21) Appl. No.: 14/847,513

(22) Filed: Sep. 8, 2015

(65) Prior Publication Data

US 2017/0067485 A1    Mar. 9, 2017

(51) Int. Cl.

| | |
|---|---|
| *F04D 29/62* | (2006.01) |
| *F04D 29/64* | (2006.01) |
| *F04D 29/66* | (2006.01) |
| *F04D 29/70* | (2006.01) |
| *H02K 5/24* | (2006.01) |
| *F04D 17/16* | (2006.01) |
| *F04D 25/08* | (2006.01) |

(52) U.S. Cl.
CPC ......... *F04D 29/626* (2013.01); *F04D 29/646* (2013.01); *F04D 29/668* (2013.01); *H02K 5/24* (2013.01); *F04D 17/16* (2013.01); *F04D 25/08* (2013.01); *F04D 29/703* (2013.01)

(58) Field of Classification Search
CPC .... F04D 29/626; F04D 29/646; F04D 29/668; F04D 29/703; F04D 25/08; H02K 5/00; H02K 5/24
USPC .................................. 417/363; 248/603, 604
See application file for complete search history.

(56) References Cited

U.S. PATENT DOCUMENTS

| | | | | |
|---|---|---|---|---|
| 3,127,092 | A | * | 3/1964 | Shenberger ........... F04D 29/626 310/91 |
| 3,145,910 | A | * | 8/1964 | Jolly ..................... F04D 29/626 248/604 |
| 3,401,870 | A | * | 9/1968 | Crowe .................. F04D 29/626 417/353 |
| 3,830,595 | A | * | 8/1974 | Carpenter ............... F16F 15/08 248/603 |
| 4,946,348 | A | | 8/1990 | Yapp |
| 5,152,661 | A | | 10/1992 | Sheets |
| 5,156,524 | A | | 10/1992 | Forni |
| 6,092,988 | A | | 7/2000 | Botros |
| 7,108,482 | B2 | | 9/2006 | Chapman |
| 7,473,071 | B2 | | 1/2009 | Goerig et al. |

(Continued)

*Primary Examiner* — Peter J Bertheaud
(74) *Attorney, Agent, or Firm* — Armstrong Teasdale LLP

(57) ABSTRACT

A centrifugal blower assembly includes a housing defining an interior space and an impeller configured to channel an airflow within the interior space. The blower assembly also includes a motor coupled to the impeller and configured to rotate the impeller about an axis. The motor includes a motor shell and a motor mounting assembly coupled to the motor. The motor mounting assembly includes an end shield coupled to the motor and a plurality of mounting arms coupled to the end shield. At least a portion of at least one mounting arm extends axially along the motor such that a continuous radial gap is defined between the at least one mounting arm and the motor shell.

13 Claims, 9 Drawing Sheets

(56) References Cited

U.S. PATENT DOCUMENTS

| | | |
|---|---|---|
| 7,500,825 B2 | 3/2009 | Hanai |
| 8,231,331 B2 | 7/2012 | Wu |
| 2012/0057971 A1 | 3/2012 | Mitsuishi et al. |
| 2014/0023521 A1* | 1/2014 | Post ..................... F04D 17/162 |
| | | 417/53 |

* cited by examiner

CENTRIFUGAL BLOWER AND METHOD OF ASSEMBLING THE SAME

BACKGROUND

The field of the disclosure relates generally to centrifugal blowers, and more specifically, to a motor mounting assembly that improves blower efficiency and reduces blower noise.

Centrifugal blowers or fans are commonly used in the automotive, air handling, and ventilation industries for directing large volumes of forced air, over a wide range of pressures, through a variety of air conditioning components. In some known centrifugal blowers, air is drawn into the blower housing through one or more inlet openings by an impeller, which defines an inlet chamber. The impeller is rotated by a motor that is mounted within the inlet chamber by a plurality of mounting arms. In some known centrifugal blowers, the motor operates at various resonances and in different modes that cause the motor to vibrate. At least some known centrifugal blowers include motor mounting assemblies that transfer the vibrations from the motor, through a plurality of mounting arms, and into the blower housing. Such vibrations cause the blower housing to generate acoustical noise, any amount of which may be objectionable to a user.

BRIEF DESCRIPTION

In one aspect, a centrifugal blower assembly is provided. The centrifugal blower assembly includes a housing defining an interior space and an impeller configured to channel an airflow within the interior space. A motor, having a motor shell, is coupled to the impeller and configured to rotate the impeller about an axis. The centrifugal blower assembly also includes a motor mounting assembly coupled to the motor. The motor mounting assembly includes an end shield coupled to the motor and a plurality of mounting arms coupled to the end shield. At least a portion of at least one mounting arm extends axially along the motor such that a continuous radial gap is defined between the at least one mounting arm and the motor shell.

In another aspect, a motor mounting assembly for use in a centrifugal blower assembly including a motor having a motor shell is provided. The motor mounting assembly includes an end shield coupled to the motor and a plurality of mounting arms coupled to the end shield. At least one mounting arm of the plurality of mounting arms includes an end portion coupled to the end shield and a body portion coupled to the end portion. The body portion extends axially along the motor such that a continuous radial gap is defined between body portion and the motor shell.

In yet another aspect, a method of assembling a centrifugal blower assembly is provided. The method includes providing a housing that defines an interior space and positioning an impeller within the housing such that the impeller is configured to channel an airflow within the interior space. A motor, including a motor shell, is coupled to the impeller such that the motor is configured to rotate the impeller about an axis. The method also includes coupling an end shield to the motor and coupling a plurality of mounting arms between the end shield and the housing such that at least a portion of at least one mounting arm extends axially along the motor such that a continuous radial gap is defined between the mounting arm and the motor shell.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
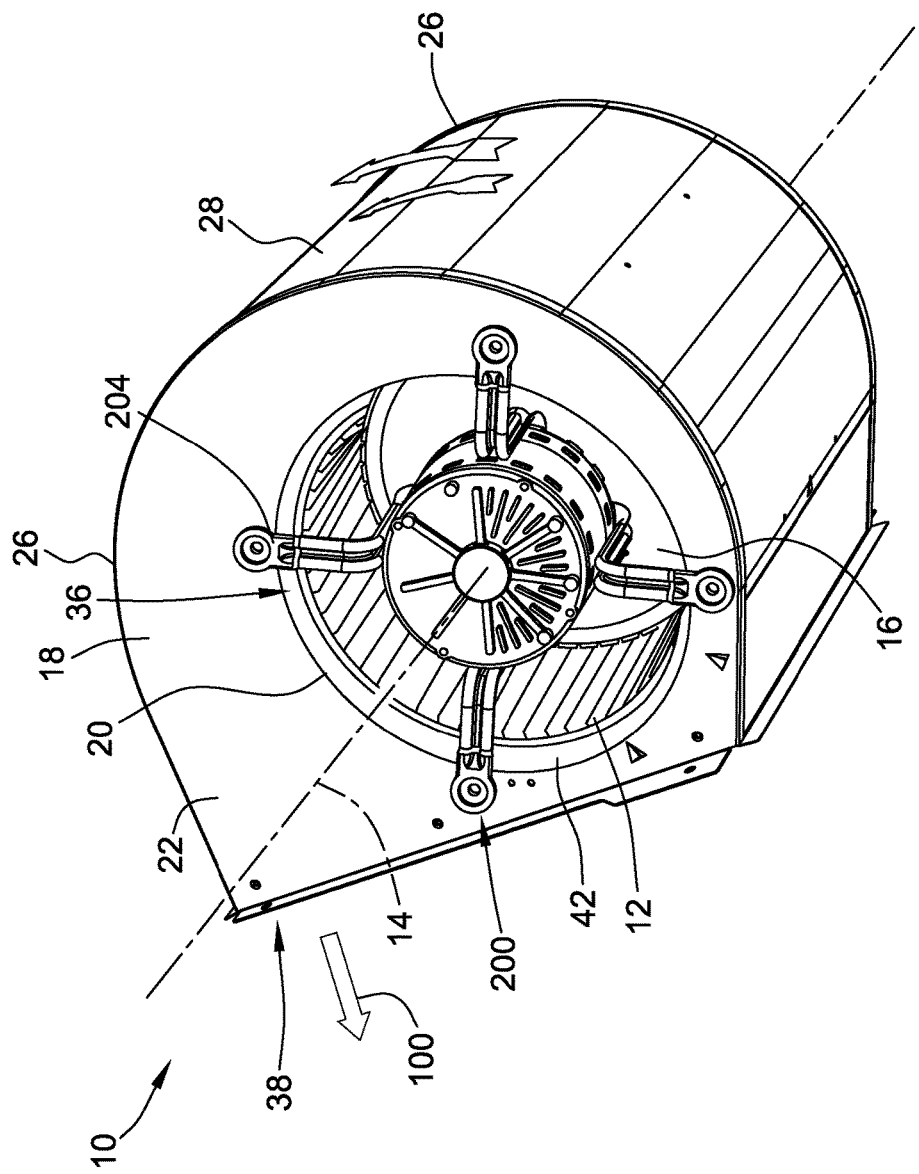
FIG. 1 is a perspective of an exemplary centrifugal blower.
Figure 2:
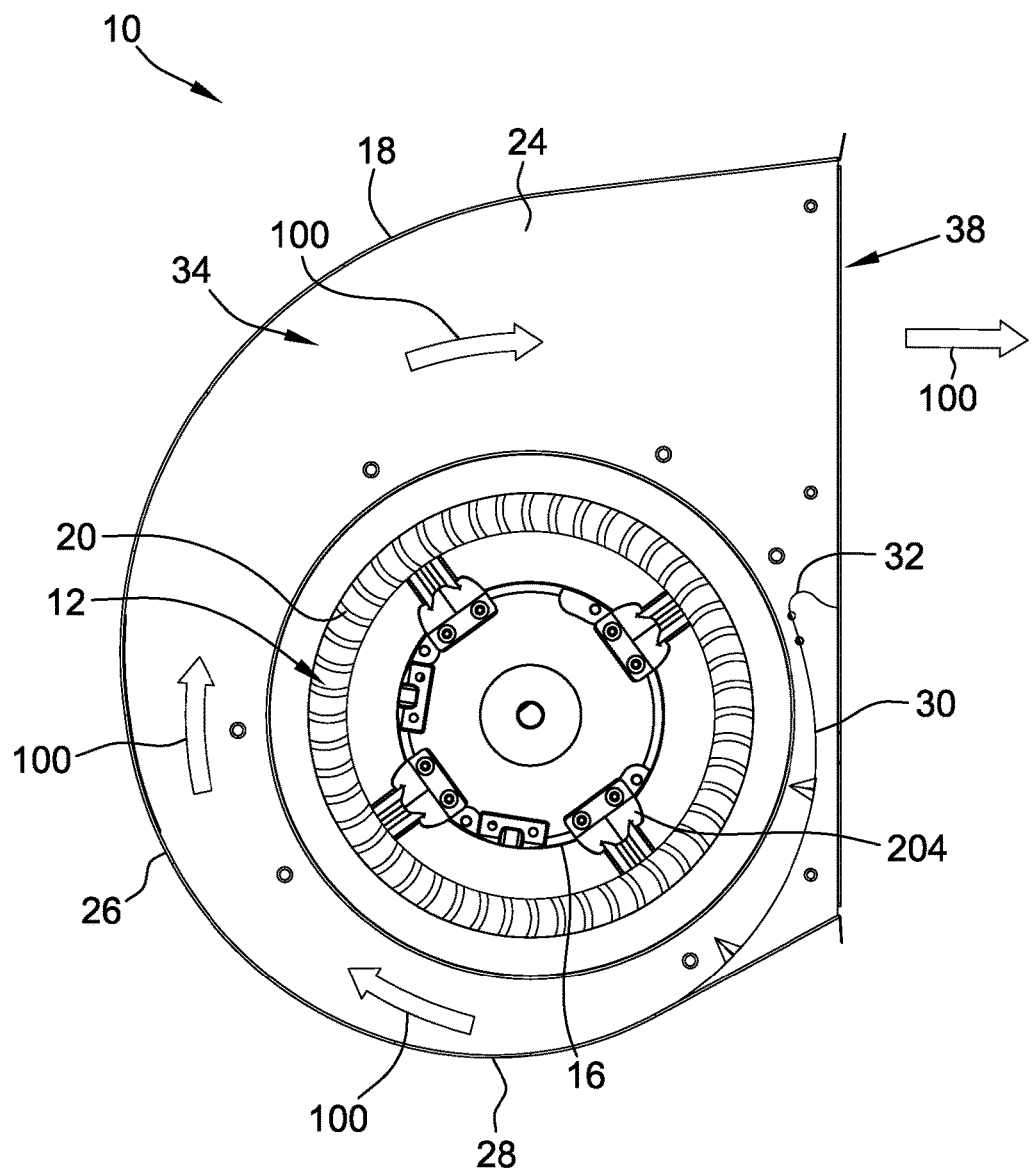
FIG. 2 is a cross-sectional view of the centrifugal blower shown in FIG. 1.

FIG. 1 is a schematic perspective view of an exemplary centrifugal blower assembly 10. FIG. 2 is a cross-sectional view of centrifugal blower assembly 10. In the exemplary embodiment, centrifugal blower assembly 10 includes a fan impeller 12 having an axis of rotation 14. Fan impeller 12 is coupled to a motor 16, which is configured to rotate fan impeller 12 about axis of rotation 14. In one embodiment, motor 16 is an axial flux electric motor. In an alternative embodiment, motor 16 is a radial flux electric motor. The rotation of fan impeller 12 draws air into centrifugal blower assembly 10 along axis of rotation 14 as represented by airflow arrows 100, and expels the air radially outward into a housing 18. In the exemplary embodiment, fan impeller 12 is formed from a plurality of forward curved fan blades 20. Alternatively, fan blades 20 may include backward curved blades, airfoil blades, backward inclined blades, radial blades, or any other suitable blade shape that enables fan impeller 12 to operate as described herein. Fan impeller 12 is configured to produce a flow of air for a forced air system, e.g., without limitation, a residential HVAC system.

In the exemplary embodiment, housing 18 includes a first sidewall 22 and an opposite second sidewall 24. Sidewalls 22 and 24 are fabricated as generally flat, parallel sidewalls disposed at axially opposite ends of fan impeller 12. An outer periphery 26 of each of sidewalls 22 and 24 is shaped substantially the same and generally forms a volute shape with respect to axis of rotation 14. In the exemplary embodiment, blower assembly 10 further includes a scroll wall 28. More specifically, scroll wall 28 is coupled to outer periphery 26 of sidewalls 22 and 24 thereby forming an increasing expansion angle for airflow 100 through housing 18. In the exemplary embodiment, scroll wall 28, which extends around fan impeller 12, includes a cutoff portion 30 including a cutoff point 32 that is at least partially disposed within an interior space 34 of housing 18. Interior space 34 is defined at least by sidewalls 22 and 24 and by scroll wall 28.

In the exemplary embodiment, housing 18 includes an air inlet opening 36 provided in first sidewall 22. Alternatively, second sidewall 24 may include an opening (not shown) to accommodate motor 16. Further, an air outlet opening 38 is defined, at least in part, by cutoff portion 30, sidewalls 22 and 24, and scroll wall 28. In the exemplary embodiment, airflow 100 is expelled from centrifugal blower assembly 10 through air outlet opening 38. In the exemplary embodiment, each component of housing 18 may be fabricated from any material that enables housing 18 to function as described herein, for example, without limitation, aluminum, steel, thermoplastics, fiber reinforced composite materials, or any combination thereof.

Further, in the exemplary embodiment, motor 16 of centrifugal blower assembly 10 is positioned in air inlet opening 36 and is coupled to housing 18 by a motor mounting assembly 200 that includes an end shield (not shown in FIGS. 1 and 2) and a plurality of mounting arms 204.

Although four mounting arms 204 are shown, motor mounting assembly 200 may include any number of mounting arms 204, as described in further detail below. In the exemplary embodiment, one of the plurality of mounting arms 204 is aligned with a direction of airflow into inlet opening 36, and the remaining mounting arms 204 are positioned in low flow rate areas about inlet opening 36 such that mounting arms 204 cause a minimal disturbance to the airflow entering inlet opening 36. In the exemplary embodiment, mounting arms 204 are evenly circumferentially-spaced about inlet opening 36. Alternatively, mounting arms 204 may be spaced in any manner that facilitates operation of blower assembly 10 as described herein. In the exemplary embodiment, mounting arms 204 are coupled to sidewall 22 and extend into inlet opening 36 to couple to motor 16. In an alternative embodiment, mounting arms 204 are coupled to an inlet ring 42 and extend into inlet opening 36. Inlet ring 42 is coupled to sidewall 22 and includes an arcuate surface at inlet opening 36 to improve blower assembly 10 efficiency.

In operation, fan impeller 12 rotates about axis of rotation 14 to draw air into housing 18 through air inlet opening 36. The amount of air moved by centrifugal blower assembly 10 increases as fan impeller 12 moves within housing 18 from cutoff point 32 towards air outlet opening 38. Scroll wall 28 is positioned progressively further away from fan impeller 12 in the direction of rotation of fan impeller 12 to accommodate the increasing volume of air due to the volute shape of housing 18. Fan impeller 12 generates high velocity airflow 100 that is exhausted from air outlet opening 38. Fan impeller 12 draws airflow 100 into centrifugal blower assembly 10 through air inlet opening 36 in the axial direction (referring to axis of rotation 14) and turns airflow 100 to a generally radial direction (generally perpendicular to axis of rotation 14).

Figure 3:
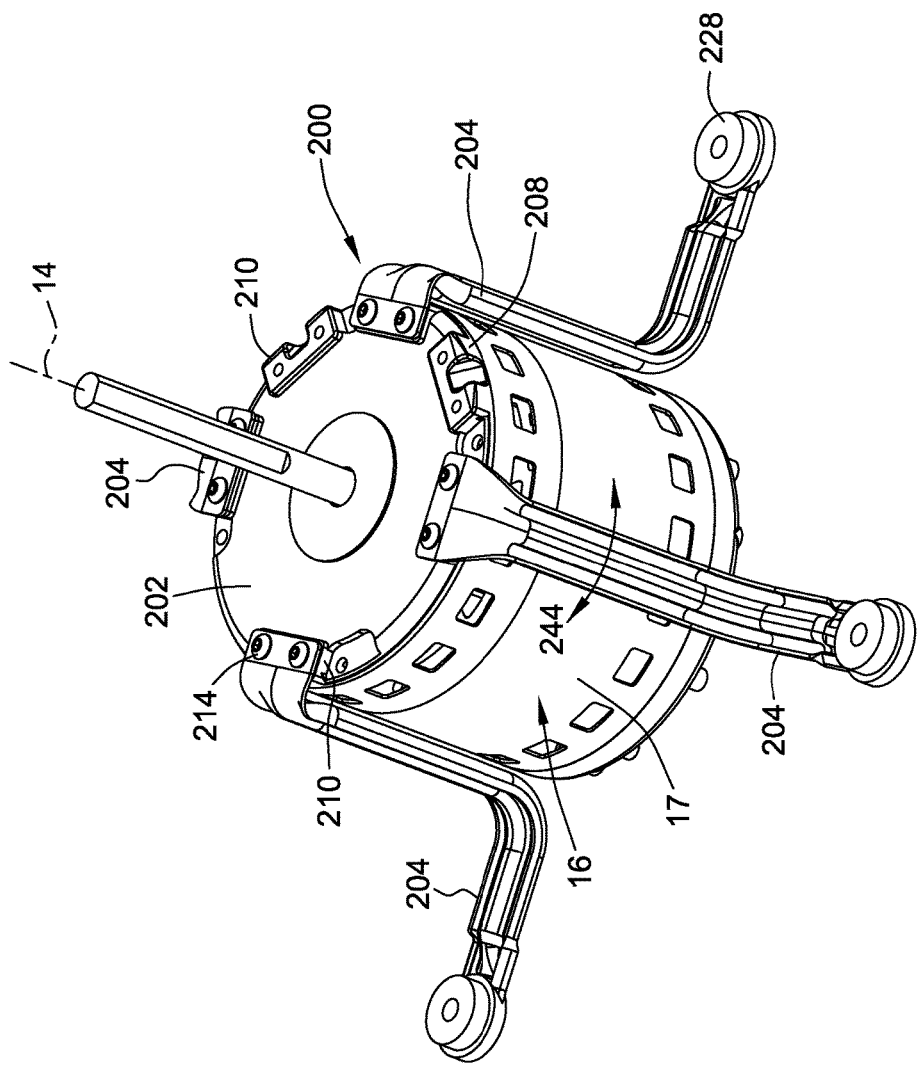
FIG. 3 is a perspective view of an exemplary electric motor and motor mounting assembly for use with the centrifugal blower shown in FIG. 1.
Figure 4:
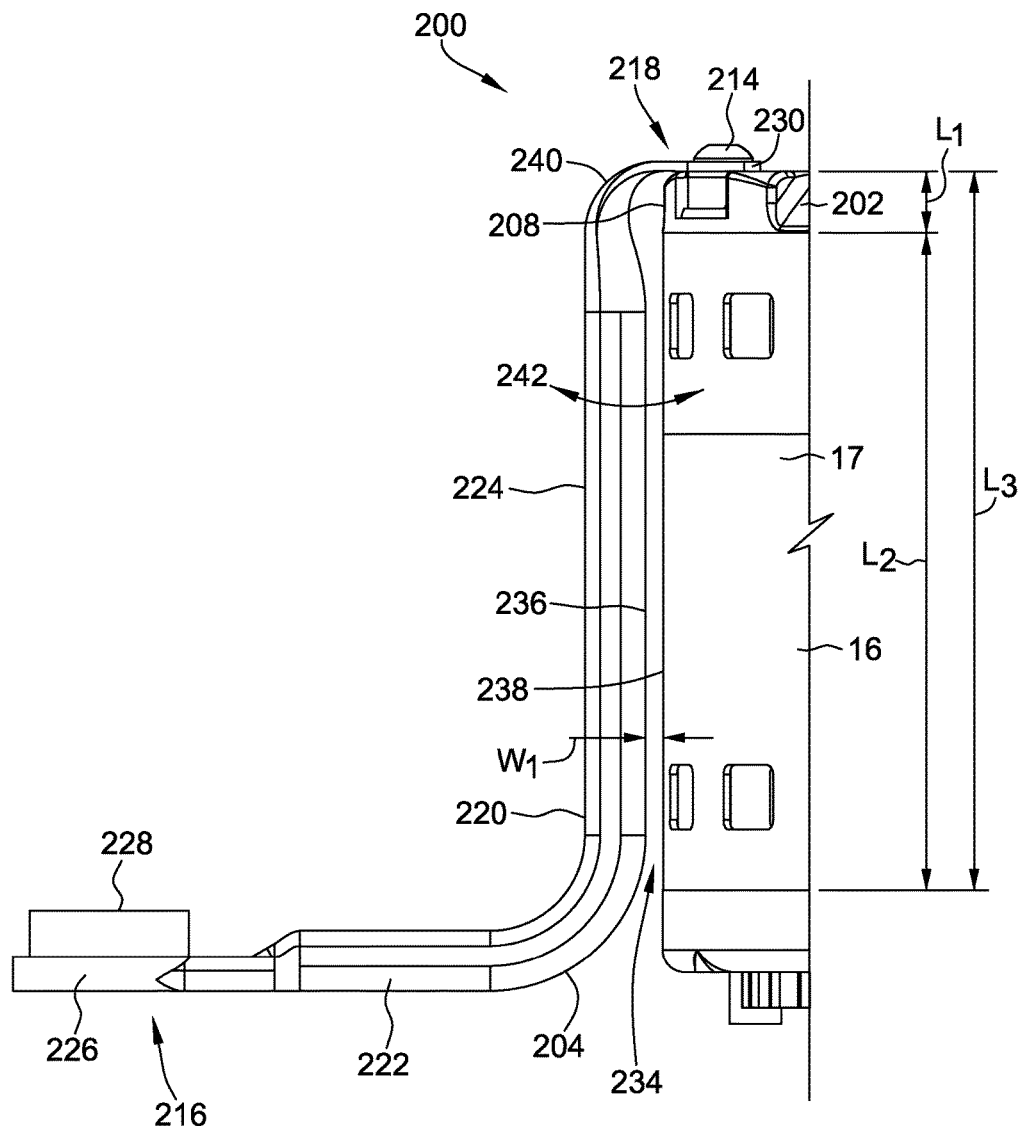
FIG. 4 is a side view of a portion of the motor mounting assembly shown in FIG. 3.
Figure 5:
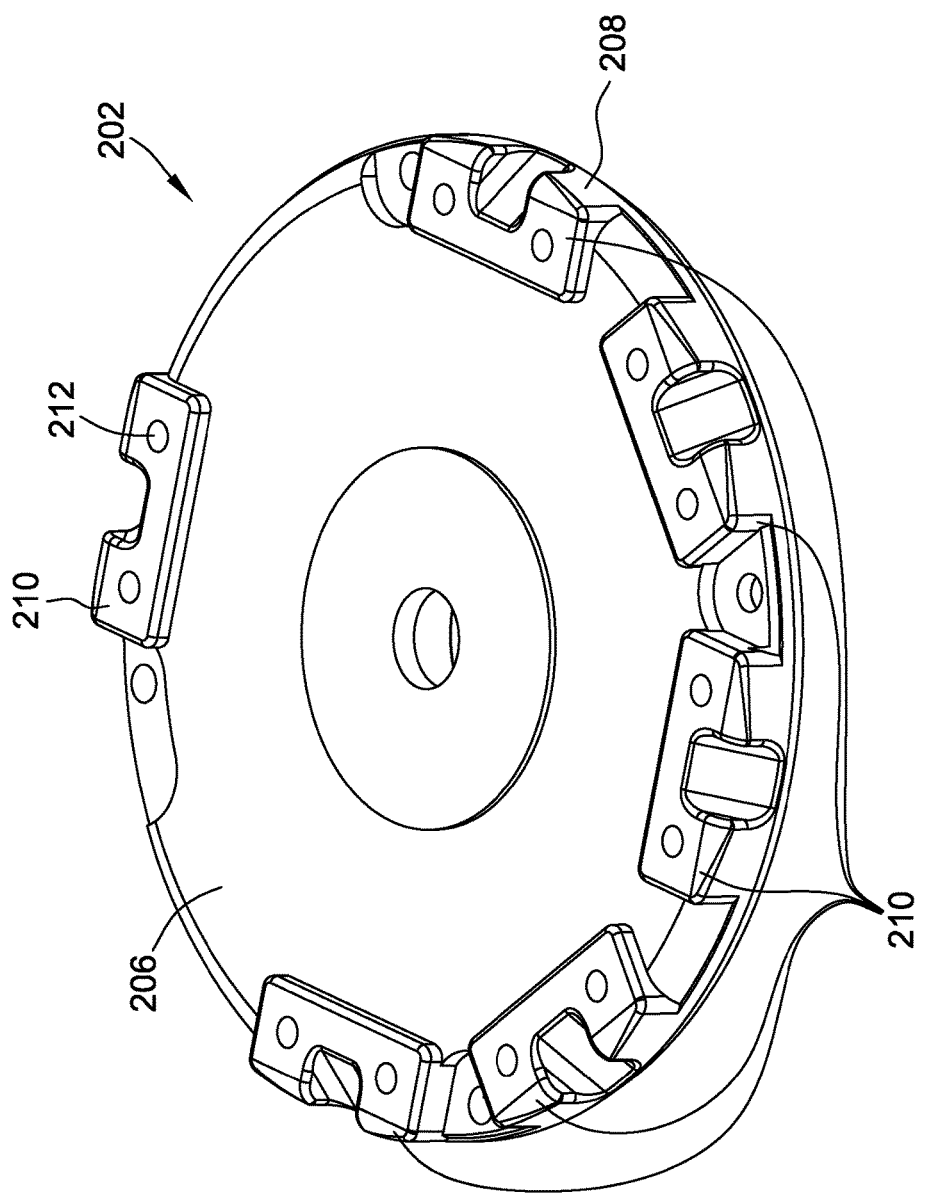
FIG. 5 is a perspective view of an exemplary end shield for use with the motor mounting assembly shown in FIG. 3.

FIG. 3 is a perspective view of electric motor 16 and motor mounting assembly 200 that may be used in centrifugal blower assembly 10 (shown in FIG. 1). In the exemplary embodiment, motor mounting assembly 200 includes an end shield 202 coupled to motor 16 and the plurality of mounting arms 204 coupled to end shield 202. FIG. 4 is a side view of a portion of motor mounting assembly 200. FIG. 5 is a perspective view of end shield 202, and FIG. 6 is a perspective view of one mounting arm 204.

In the exemplary embodiment, end shield 202 is coupled to a motor shell 17 of motor 16 and includes an end surface 206 and an axial side surface 208. End shield 202 also includes a plurality of platforms 210 extending axially from end surface 206. Each platform 210 includes at least one opening 212 (shown in FIG. 5) defined therein that receives a fastener 214 (shown in FIGS. 3 and 4) to facilitate coupling mounting arm 204 to platform 210. In the exemplary embodiment, motor mounting assembly 200 includes four mounting arms 204, as shown in FIG. 3, to define a four-mounting arm configuration where each mounting arm 204 is oriented substantially 90 degrees from an adjacent mounting arm 204 about end shield 202. Alternatively, motor mounting assembly 200 includes three mounting arms 204 to define a three-mounting arm configuration where each mounting arm 204 is oriented within a range of between approximately 90 degrees to approximately 135 degrees from an adjacent mounting arm 204 about end shield 202. More specifically, end shield 202 includes sufficient platforms 210 to facilitate either a three-mounting arm configuration or a four-mounting arm configuration. That is, platforms 210 are oriented about end shield 202 such that a user may use either three mounting arms 204 or four mounting arms 204 to mount motor 16 to housing 18. As such, not every platform 210 will be coupled to a mounting arm 204. In the exemplary embodiment, the different configurations share at least one common platform 210. Alternatively, each configuration includes dedicated platforms 210. In another embodiment, end shield 202 does not include distinct platforms and mounting arms are coupled directly to end shield 202.

Furthermore, platforms 210 are positioned at predetermined locations about end shield 202 that result in isolating vibrations transferred from mounting arms 204 to housing 16. More specifically, platforms 210, and therefore mounting arms 204, are positioned about end shield 202 at nodes of known motor resonances to reduce vibrations transferred to housing 16.

Figure 6:
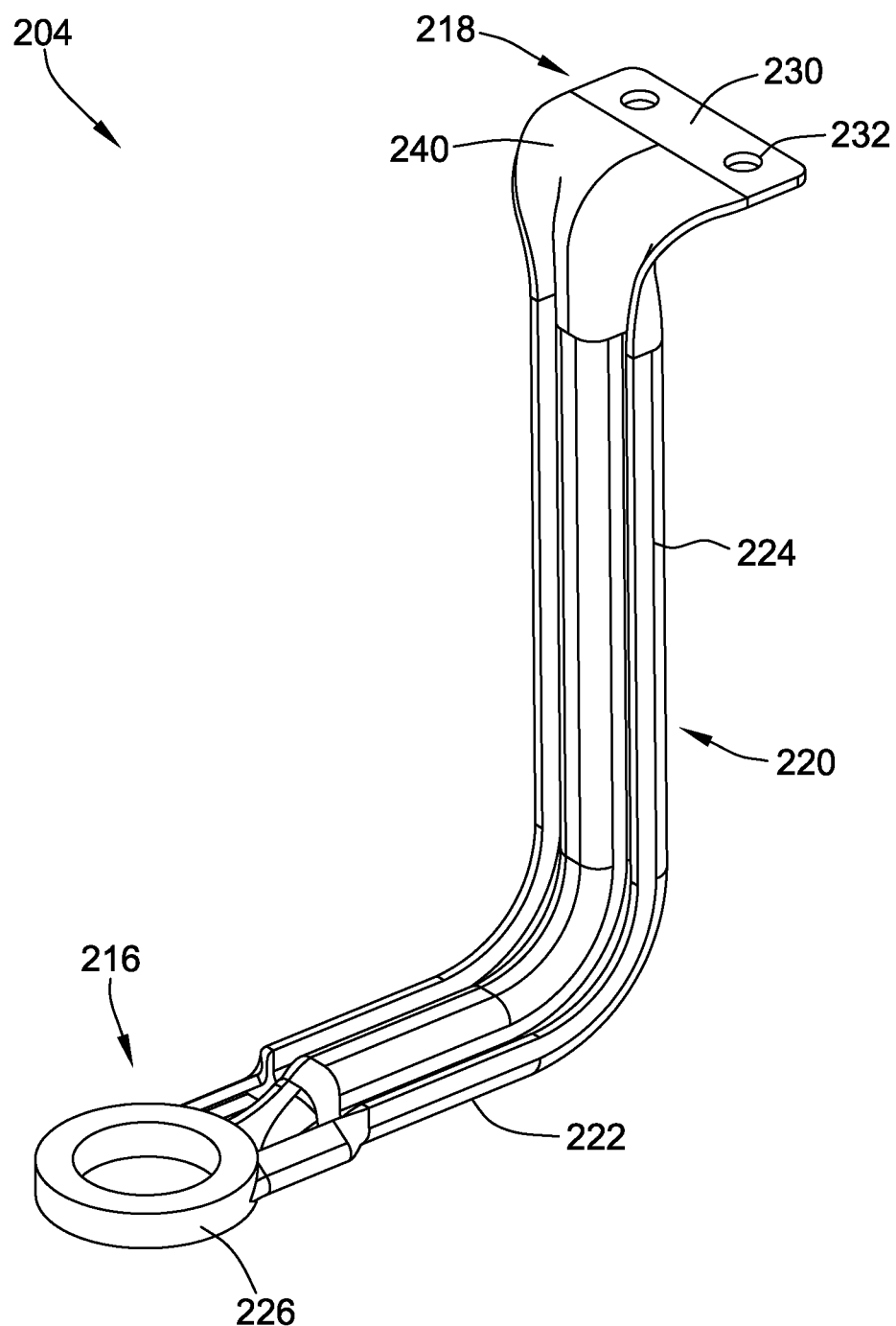
FIG. 6 is a perspective view of an exemplary mounting arm for use with the motor mounting assembly shown in FIG. 3.

Referring now to FIGS. 4 and 6, in the exemplary embodiment, each mounting arm 204 includes a first end 216, an opposing second end 218, and a body portion 220 extending therebetween. Body portion 220 includes a first body portion 222 proximate first end 216, and a second body portion 224 proximate second end 218. In the exemplary embodiment, first body portion 222 is substantially perpendicular to second body portion 224. Alternatively, first body portion 222 is oriented in any direction with respect to second body portion 224 that enables mounting assembly 200 to operate as described herein. In the exemplary embodiment, first end 216 includes a mounting bracket 226 formed integrally therewith that is coupled to housing 18 (shown in FIG. 1). Alternatively, mounting bracket 226 is a separate component coupled to first end 216. Mounting bracket 226, as shown in FIG. 4, is substantially flat and is coupled to an outer surface of sidewall 22 (shown in FIG. 1). Alternatively, mounting bracket 226 is coupled to ring 42. Furthermore, motor mounting assembly 200 includes an isolation and damping device 228 positioned between mounting bracket 226 and sidewall 22 to reduce transmission of vibrations between mounting arm 204 and sidewall 22.

In the exemplary embodiment, second end 218 includes a substantially flat flange 230 oriented substantially perpendicular to second body portion 224. Flange 230 includes at least one opening 232 defined therein to receive fastener 214 for coupling flange 230 to end shield platform 210. In the exemplary embodiment, second end 218 and flange 230 are integrally formed with body 220 such that body 220 and second end 218 are monolithic. More specifically, at least body 220 and second end 218 are fabricated from a single piece of material through a metal stamping process. Alternatively, body 220 and second end 218 are integrally formed from any material that facilitates operation of motor mounting assembly 200 as described herein. Generally, second end 218 is coupled to platform 210 by any means that facilitates operation of motor mounting assembly 200 as described herein.

In the exemplary embodiment, when mounting arm 204 is coupled to end shield 202, body portion 220 extends axially along motor shell 17 such that a continuous radially-extending gap 234 is defined between mounting arm body 220 and motor shell 17. More specifically, second body portion 224 includes an inner surface 236 and motor shell 17 includes an exterior surface 238 that define radial gap 234 therebetween. End shield side surface 208 includes an axial length L1, and motor shell exterior surface 238 includes an axial length L2. Gap 234 includes an axial length L3 equal to or greater than the combined lengths L1 and L2 of surface 208 and 236 such that no portion of mounting arm 204 contacts end shield side surface 208 or motor shell exterior surface 238. Gap 234 also includes a radial width W1. As described above, motor 16 may vibrate in operation. Accordingly, gap 234 is sized with a predetermined width W1 to ensure that, even at a maximum vibration amplitude of motor 16, motor shell 17 does not contact body 220. As such, because no contact exists between motor shell 17 and mounting arm 204, vibrations from motor 16 are not transmitted through motor mounting assembly 200 from motor shell 17.

In the exemplary embodiment, a pivot point 240 is formed at the curved juncture of second end 218 and second body portion 224 such that body 220 and first end 216 of mounting arm 204 flex, with respect to second end 218, about pivot point 240. More specifically, body 220 flexes in at least one of a first direction 242 that is substantially radial with respect to axis 214 and a second direction 244 (shown in FIG. 3) that is substantially tangential to motor shell 17. As such, mounting arm 204 is designed with both radial and torsional flexibility such that when motor 16 vibrates, the vibrations are isolated at pivot point 240 and are not transmitted to the remainder of mounting arm 204. Isolating the vibrations at pivot point 240 substantially prevents transfer of vibrations to blower housing 14. Mounting arm 204 includes a predetermined spring constant at pivot point 240 that enables motor to vibrate, but prevents body 220 from doing so, and, as such, provides isolation of a cantilevered radial mode of motor 16. As described above, gap 234 includes width W1 when motor 16 is at rest. When motor is operational, width W1 varies along with the resonance of motor 16. That is, at various times during operation, width W1 of gap 234 may be greater than or less than width W1 shown in FIG. 4. However, width W1 is always greater than zero, as motor shell 17 does not contact mounting arm body 220.

Figure 7:
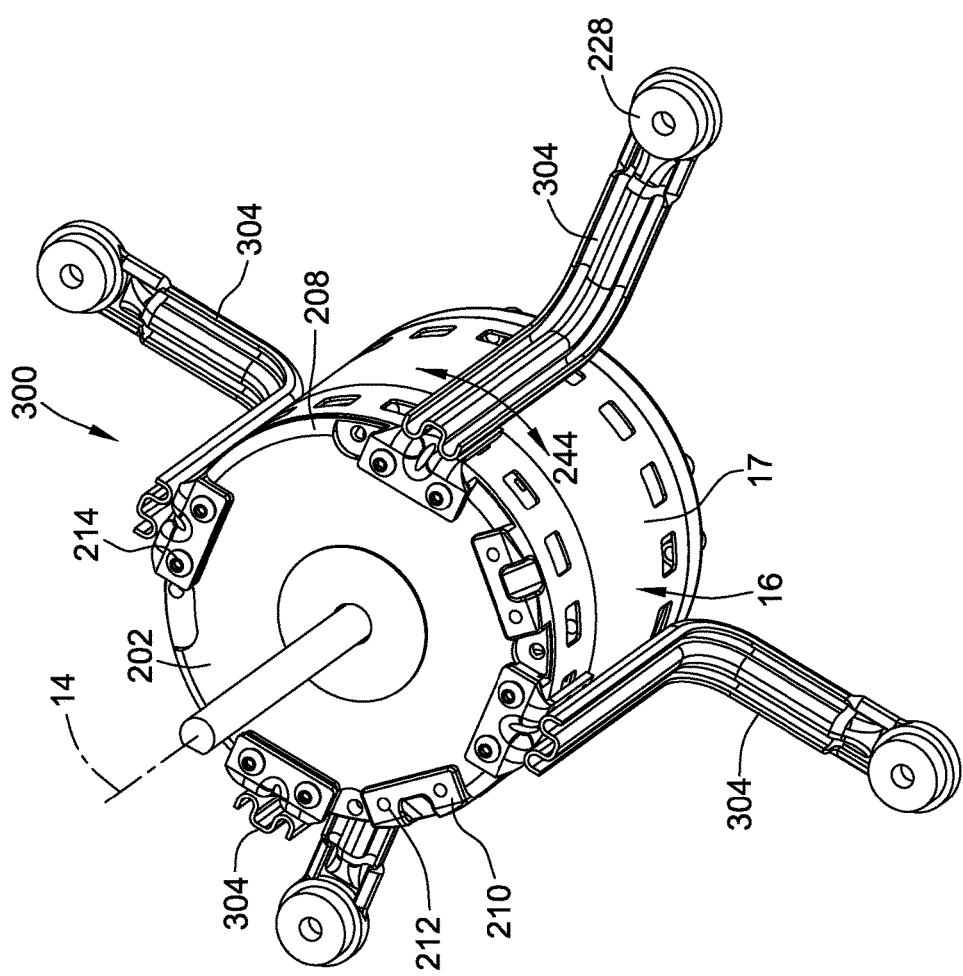
FIG. 7 is a perspective view of an electric motor and an alternative motor mounting assembly for use with the centrifugal blower shown in FIG. 1.
Figure 8:
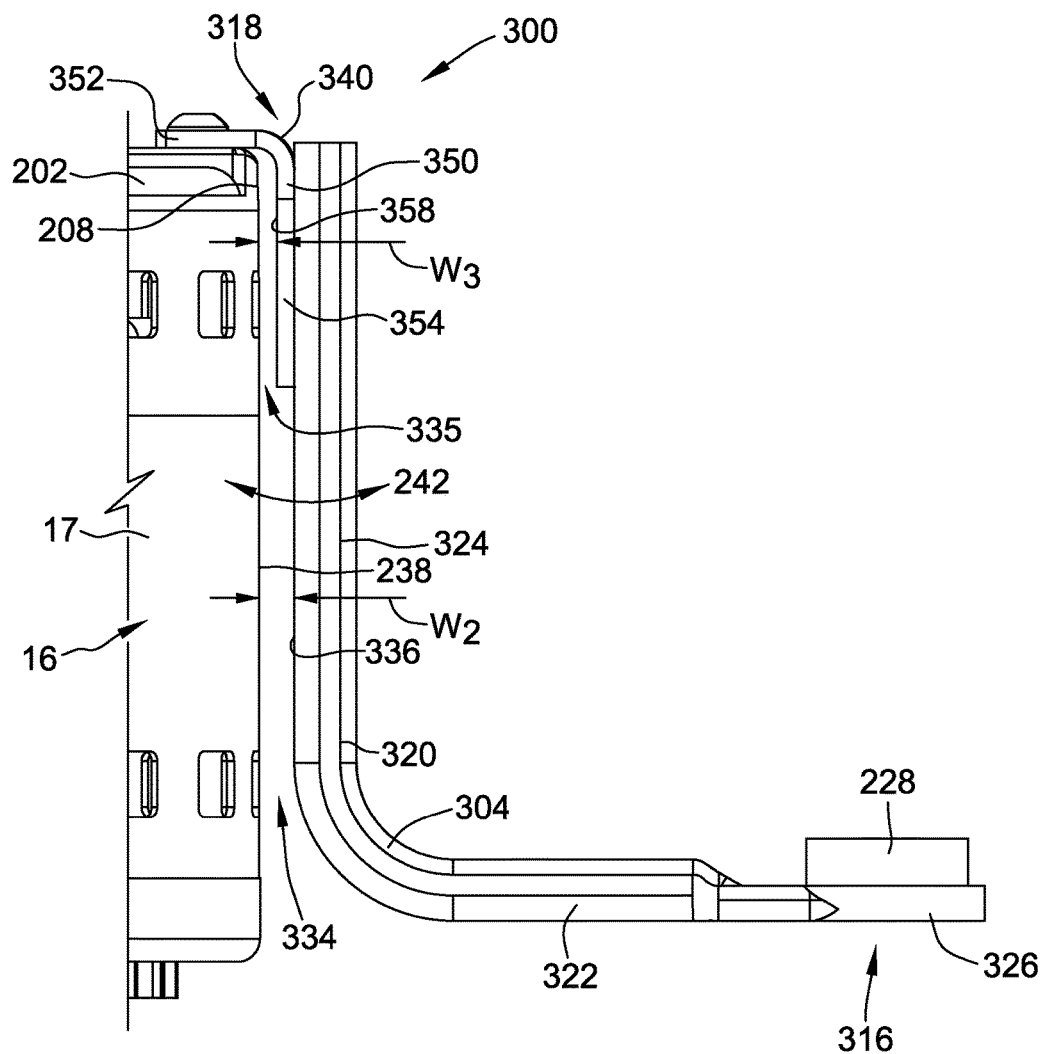
FIG. 8 is a side view of a portion of the motor mounting assembly shown in FIG. 7.
Figure 9:
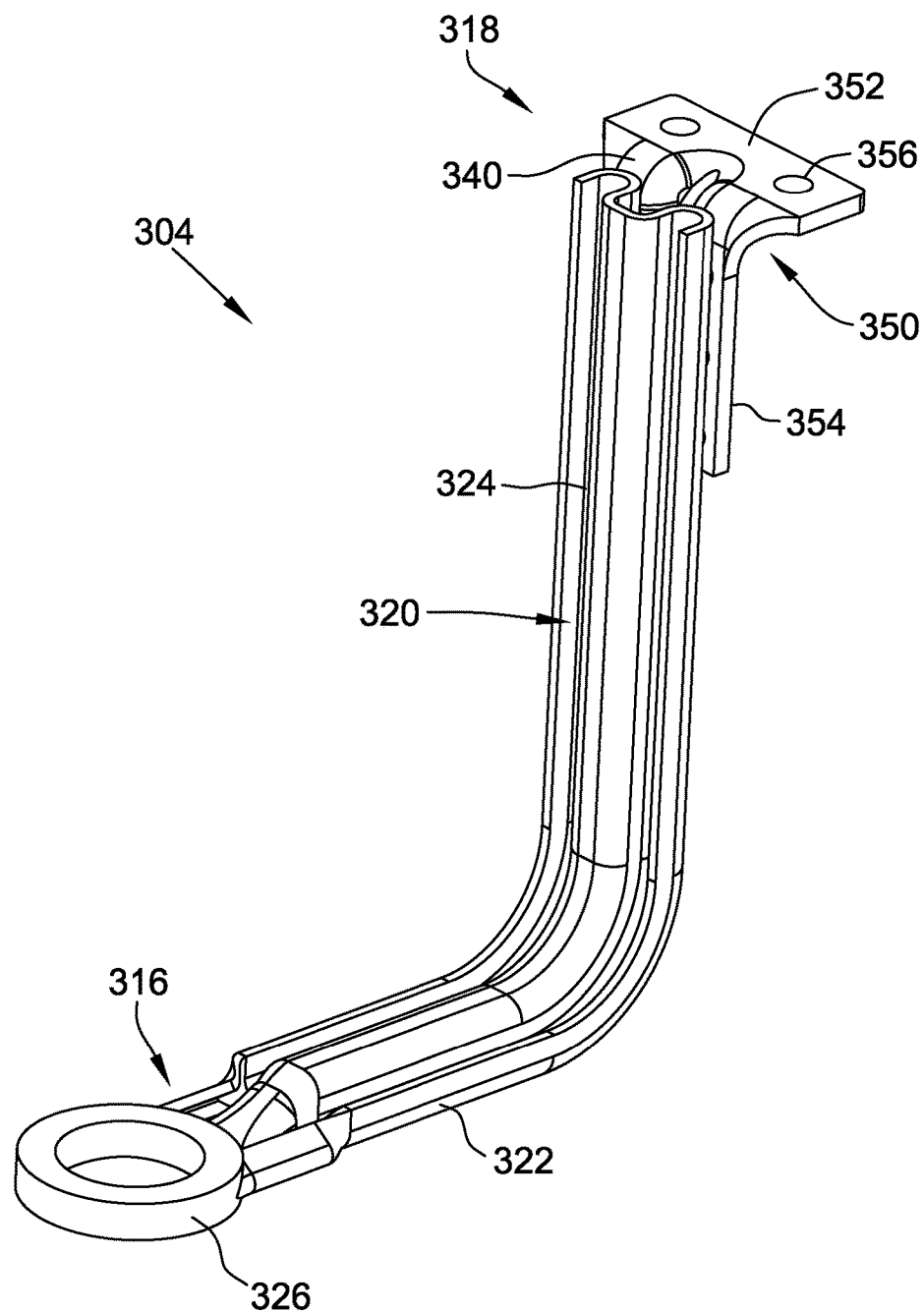
FIG. 9 is a perspective view of an alternative mounting arm for use with the motor mounting assembly shown in FIG. 7.

FIG. 7 is a perspective view of motor 16 and an alternative motor mounting assembly 300 that may be used with centrifugal blower assembly 10 (shown in FIG. 1). FIG. 8 is a side view of a portion of motor mounting assembly 300, and FIG. 9 is a perspective view of an alternative mounting arm 304 for use with motor mounting assembly 300. Motor mounting assembly 300 is substantially similar to motor mounting assembly 200 in operation and composition, with the exception that motor mounting assembly 300 includes mounting arm 304 having a mounting bracket 350 coupled to a mounting arm body 320 at a second end 318, rather than flange 230 (shown in FIG. 4) being integrally formed with mounting arm body 220 (shown in FIG. 4). As such, components shown in FIGS. 7-9 are labeled with the same reference numbers used in FIGS. 3-6.

Motor mounting assembly 300 includes end shield 202 and a plurality of mounting arms 304. Similar to mounting arms 204, mounting arms 304 include a first end 316, an opposing second end 318, and a body portion 320 extending therebetween. Body portion 320 includes a first body portion 322, proximate first end 316, and a second body portion 324 proximate second end 318. Second body portion 324 is substantially perpendicular to first body portion 322. In the exemplary embodiment, first end 316 includes a mounting bracket 326 formed integrally therewith that is coupled to housing 18 (shown in FIG. 1). Alternatively, mounting bracket 326 may be a separate component coupled to first end 316. Mounting bracket 326, as shown in FIG. 8, is substantially flat and is coupled to an outer surface of sidewall 22 (shown in FIG. 1). Alternatively, mounting bracket 326 is coupled to ring 42. Furthermore, motor mounting assembly 300 includes isolation and damping device 228 positioned between mounting bracket 326 and sidewall 22 to reduce transmission of vibrations between mounting arm 304 and sidewall 22.

Second end 218 includes mounting bracket 350 that is coupled to mounting arm body 320. Mounting bracket 350 includes a substantially flat flange 352 and an extension portion 354 oriented substantially perpendicular to flange 352. Flange 352 includes at least one opening 356 defined therein to receive fastener 214 for coupling flange 352 to end shield platform 210. Extension portion 354 extends axially along and is coupled to second body portion 324. In the exemplary embodiment, mounting bracket 350 and body 320 are separate components coupled together via welding. Alternatively, mounting bracket 350 and body 320 are coupled together using any known coupling method.

In the exemplary embodiment, when mounting arm 304 is coupled to end shield 202, body portion 320 extends axially along motor shell 17 such that a continuous radially-extending gap 334 is defined between mounting arm body 220 and motor shell 17. More specifically, second body portion 324 includes an inner surface 336 and motor shell 17 includes an exterior surface 238 that define radial gap 334 therebetween. Furthermore, a second gap 335 is defined between an inner surface 358 of extension portion 354 and motor shell surface 238. Similar to gap 234, gaps 334 and 335 ensure that no portion of mounting arm 304 contacts end shield side surface 208 or motor shell exterior surface 238. Gap 334 also includes a radial width W1 and gap 335 includes a radial width W3. As described above, motor 16 may vibrate in operation, gaps 334 and 335 are sized with predetermined widths W2 and W3 to ensure that, even at a maximum vibration amplitude of motor 16, motor shell 17 does not contact extension portion 354 or body 320. As such, because no contact exists between motor shell 17 and mounting arm 304, vibrations from motor 16 are not transmitted through motor mounting assembly 300 from motor shell 17.

In the exemplary embodiment, a pivot point 340 is formed at the curved juncture of flange 352 and extension portion 354 such that body 320 and first end 316 of mounting arm 304 flex, with respect to second end 318, about pivot point 340. More specifically, body 320 flexes in at least one of first direction 242 that is substantially radial with respect to axis 214 and second direction 244 (shown in FIG. 3) that is substantially tangential to motor shell 17. As such, mounting arm 304 is designed with both radial and torsional flexibility such that when motor 16 vibrates, the vibrations are isolated at pivot point 340 and are not transmitted to the remainder of mounting arm 304. Isolating the vibrations at pivot point 340 substantially prevents transfer of vibrations to blower housing 14. Mounting arm 304 includes a predetermined spring constant at pivot point 340 that enables motor to vibrate, but prevents body 320 from doing so, and, as such, provides isolation of a first order radial mode of motor 16. As described above, gaps 334 and 335 include widths W2 and W3, respectively, when motor 16 is at rest. When motor is operational, widths W2 and W3 vary along with the resonance of motor 16. That is, at various times during operation, widths W2 and W3 of gaps 334 and 335 may be greater than or less than widths W2 and W3 shown in FIG. 8. However, widths W2 and W3 are always greater than zero, as motor shell 17 does not contact mounting arm 304.

The apparatus, methods, and systems described herein provide a centrifugal blower having increased efficiency and reduced noise. More specifically, the mounting arms described herein include a pivot point that facilitates isolating vibrations transferred to the mounting arms from the motor to reduce noise generated by the blower housing. The pivot point is defined at a juncture of a flange coupled to an end shield and a body portion of the mounting arm such that, even though the flange vibrates and moves with the motor, the pivot point isolates the movements and prevents the vibrations from continuing on to the body portion. Additionally, the flange is the only portion of the mounting arm that contacts the motor end shield. More specifically, the flange extends radially beyond a surface of the end shield and a motor shell such that an radially-extending gap is defined between the motor and the mounting arm body coupled to the flange. The gap enables the motor to vibrate without the motor shell or end shield contacting the mounting arm body portion.

Exemplary embodiments of the centrifugal blower are described above in detail. The centrifugal blower and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A centrifugal blower assembly comprising:
a housing defining an interior space;
an impeller configured to channel an airflow within the interior space;
a motor coupled to said impeller and configured to rotate said impeller about an axis, said motor comprising a motor shell; and
a motor mounting assembly coupled to said motor, said motor mounting assembly comprising:
an end shield coupled to said motor; and
a plurality of mounting arms coupled to said end shield, each mounting arm of said plurality of mounting arms coupled to said end shield at a node of a motor resonance of said motor to reduce vibrations transferred to said housing, wherein at least a portion of each mounting arm extends axially along said motor such that a continuous radial gap is defined between said mounting arm and said motor shell.

2. The centrifugal blower assembly in accordance with claim 1, wherein each mounting arm of said plurality of mounting arms comprises an end portion coupled to said end shield and a body portion extending from said end portion, said gap defined between said motor shell and said body portion.

3. The centrifugal blower assembly in accordance with claim 2, wherein said end portion and said body portion are monolithic.

4. The centrifugal blower assembly in accordance with claim 2, wherein a pivot point is defined at a juncture of said end portion and said body portion such that said body portion flexes with respect to said end portion about said pivot point.

5. The centrifugal blower assembly in accordance with claim 4, wherein said body portion flexes in at least one of a direction tangential with respect to said motor shell and a radial direction with respect to said axis.

6. The centrifugal blower assembly in accordance with claim 2, wherein said end portion comprises a bracket including a lip portion coupled to said end shield and an extension portion coupled to said body portion.

7. The centrifugal blower assembly in accordance with claim 1, wherein said end shield comprises a plurality of platforms extending axially from an end surface of said end shield, wherein each mounting arm is coupled to a respective platform.

8. The centrifugal blower assembly in accordance with claim 7, wherein said plurality of platforms facilitate selecting from a three-mounting arm configuration and a four-mounting arm configuration.

9. The centrifugal blower assembly in accordance with claim 1, wherein said end shield comprises a first side surface and said motor shell comprises a second side surface, and wherein said axial gap extends an entire length of a combined length of said first and said second side surfaces.

10. A method of assembling a centrifugal blower assembly, said method comprising:
providing a housing that defines an interior space;
positioning an impeller within the housing such that the impeller is configured to channel an airflow within the interior space;
coupling a motor to the impeller such that the motor is configured to rotate the impeller about an axis, the motor including a motor shell;
coupling an end shield to the motor; and
coupling a plurality of mounting arms between the end shield and the housing such that at least a portion of each mounting arm extends axially along the motor such that a continuous radial gap is defined between the mounting arm and the motor shell, each mounting arm of the plurality of mounting arms coupled to the end shield at a node of a motor resonance of the motor to reduce vibrations transferred to the housing.

11. The method in accordance with claim 10, wherein coupling a plurality of mounting arms between the end shield and the housing comprises:
coupling an end portion of each mounting arm to the end shield; and coupling a body portion of each mounting arm to the end portion of each mounting arm such that the body portion extends axially along the motor to define the axial gap between the body portion and the motor shell.

12. The method in accordance with claim 11, wherein coupling a body portion of each mounting arm to the end portion of each mounting arm further comprises defining a pivot point at a juncture of the end portion and the body portion such that the body portion flexes with respect to the end portion about the pivot point, wherein the body portion flexes in at least one of a direction tangential with respect to the motor shell and a radial direction with respect to the axis.

13. The method in accordance with claim 10, wherein coupling a plurality of mounting arms between the end shield and the housing comprises coupling a plurality of monolithic mounting arms between the end shield and the housing.

\* \* \* \* \*